(12) United States Patent
Fujiwara

(10) Patent No.: US 6,775,031 B1
(45) Date of Patent: Aug. 10, 2004

(54) APPARATUS AND METHOD FOR PROCESSING IMAGES, IMAGE READING AND IMAGE FORMING APPARATUSES EQUIPPED WITH THE APPARATUS, AND STORAGE MEDIUM CARRYING PROGRAMMED-DATA FOR PROCESSING IMAGES

(75) Inventor: Yoko Fujiwara, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,943

(22) Filed: Mar. 23, 2000

(30) Foreign Application Priority Data

Mar. 24, 1999 (JP) ............................................ 11-080426

(51) Int. Cl.⁷ .............................. H04N 1/409; G06T 5/00
(52) U.S. Cl. ...................... 358/2.1; 358/3.26; 358/3.27; 382/199; 382/205; 382/261; 382/266
(58) Field of Search ................................. 358/2.1, 3.26, 358/3.27, 462, 447; 382/199, 205, 173, 176, 266, 260, 261, 269

(56) References Cited

U.S. PATENT DOCUMENTS 5,617,216 A * 4/1997 Wada ........................... 358/2.1

FOREIGN PATENT DOCUMENTS

| JP | 03-63887 | 3/1991 | |
|---|---|---|---|
| JP | 04-356869 | 12/1992 | |
| JP | 05-268467 | 10/1993 | ............ H04N/1/40 |
| JP | 07-95409 | 4/1995 | |
| JP | 07-322060 | 12/1995 | ............ H04N/1/40 |
| JP | 7-74964 | 3/1996 | |
| JP | 08-181865 | 7/1996 | .......... H04N/1/409 |
| JP | 08-191392 | 7/1996 | |
| JP | 10-285394 | 10/1998 | |

* cited by examiner

Primary Examiner—Scott Rogers
(74) Attorney, Agent, or Firm—Morrison & Foerster LLP

(57) ABSTRACT

An image forming apparatus which is composed of an image reading unit for reading a document image and converting the document image into image data, an image processing unit for applying image processes containing edge enhancing process and smoothing process to the image data, and an image forming unit for forming the processed image data on a printing medium. The image processing unit includes a halftone dot detector for detecting a halftone dot region using the image data, a first edge detector for executing edge detection over the detected halftone dot region using a derivative filter, and a second edge detector for executing edge detection over a non-halftone dot region other than the detected halftone dot region using a derivative filter with a size different from a size of the derivative filter.

18 Claims, 7 Drawing Sheets

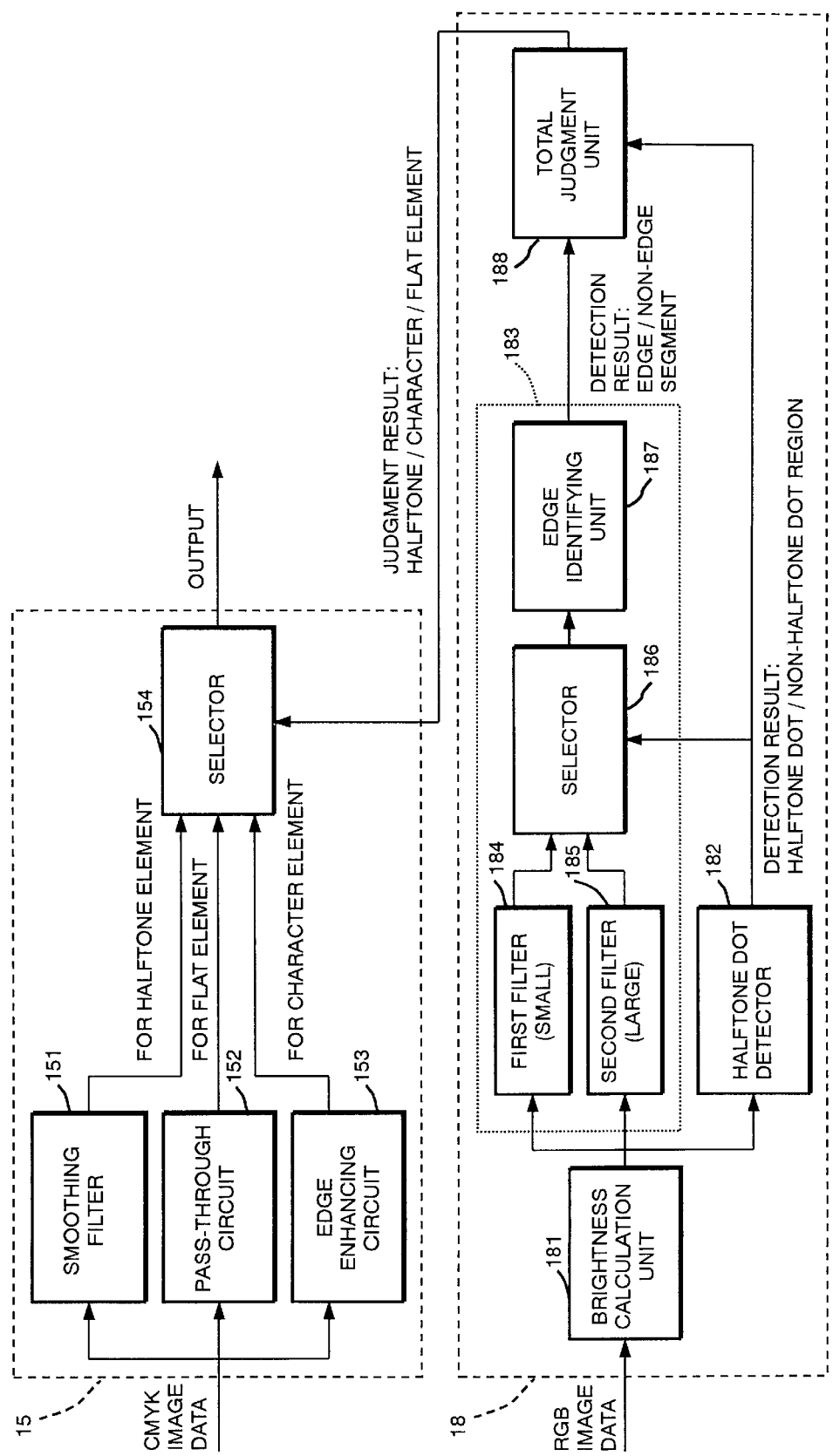

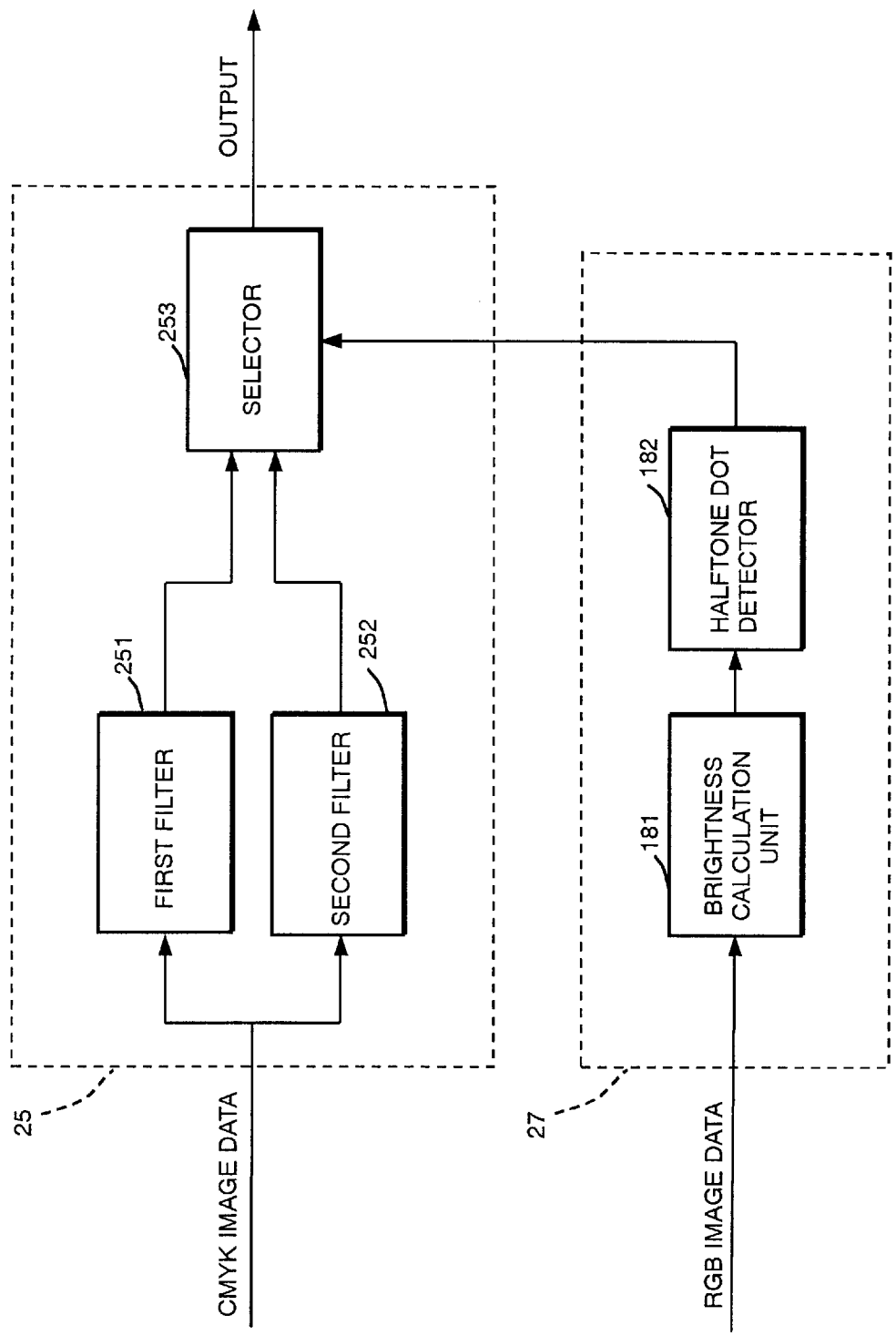

APPARATUS AND METHOD FOR PROCESSING IMAGES, IMAGE READING AND IMAGE FORMING APPARATUSES EQUIPPED WITH THE APPARATUS, AND STORAGE MEDIUM CARRYING PROGRAMMED-DATA FOR PROCESSING IMAGES

This application is based on Japanese Patent Application No. 11-80426 filed on Mar. 24, 1999, the contents of which are hereby incorporated by reference.

BACKGROUND OF THE INVENTION

1. Field of the Invention

The invention relates to an apparatus and a method for processing images, as well as to a storage medium carrying data generated by programming the method, in particular a filtering procedure for screened halftone images.

2. Description of Related Art

A majority of printed matters or documents today contain images expressed in numerous minute halftone dots, i.e., halftone images. When a document image scanned by a scanner is printed, the Moire effect may develop depending on the relation between the spatial frequency of the halftone dots contained in the document image and the dither pattern cycle.

The conventional digital copying machine applies the smoothing process to a halftone dot region to soften the edges of halftone dots in order to prevent the Moiré effect while applying the edge enhancing process to character elements in order to reproduce the character elements more sharply. However, such a method cannot be effective when character elements exist in the halftone dot region. For example, if the smoothing process is applied to the halftone dot region where character elements exist, the recreation capability for the character elements drops. On the other hand, if the enhancement process is applied to the same area, the edges of minute dots are enhanced, so that the Moiré effect may develop to deteriorate the image quality.

A method of detecting character elements in the halftone dot region by means of the spatial filter has been known. The size of the spatial filter is chosen to be larger than the spatial frequency of the halftone dots so that the edges of the halftone dots would not be mistaken as the edges of the character elements. Consequently, the edges of character elements in the non-halftone dot region, for example, the edges of fine letters written on a white background cannot be detected precisely, same as the edges of halftone dots so that the character elements cannot be sharply reproduced.

SUMMARY OF THE INVENTION

It is an object of the present invention to provide an image processing apparatus including a receiving unit for receiving image data, a halftone dot detector for detecting a halftone dot region using the received image data, a first edge detector for executing edge detection over the detected halftone dot region using a derivative filter, and a second edge detector for executing edge detection over a non-halftone dot region other than the detected halftone dot region using a derivative filter with a size different from a size of the derivative filter.

A further object of the invention is to provide an image reading apparatus including an image reading unit for reading a document image and converting the document image into image data, an image processing unit for applying image processes containing edge enhancing process and smoothing process to the image data, and a transmission unit for transmitting the processed image data. Furthermore, the image processing unit includes a halftone dot detector for detecting a halftone dot region using the image data, a first edge detector for executing edge detection over the detected halftone dot region using a derivative filter, and a second edge detector for executing edge detection over a non-halftone dot region other than the detected halftone dot region using a derivative filter with a size different from a size of the derivative filter.

Still a further object of the invention is to provide an image forming apparatus including an image reading unit for reading a document image and converting the document image into image data, an image processing unit for applying image processes containing edge enhancing process and smoothing process to the image data, and an image forming unit for forming the processed image data on a printing medium. In addition, the image processing unit includes a halftone dot detector for detecting a halftone dot region using the image data, a first edge detector for executing edge detection over the detected halftone dot region using a derivative filter, and a second edge detector for executing edge detection over a non-halftone dot region other than the detected halftone dot region using a derivative filter with a size different from a size of the derivative filter.

Still a further object of the invention is to provide an image processing apparatus including a receiving unit for receiving image data, a halftone dot detector for detecting a halftone dot region using the received image data, a first edge enhancing unit for applying edge enhancement process to the detected halftone dot region using a derivative filter, and a second edge enhancing unit for applying edge enhancement process to a non-halftone dot region other than the halftone dot region using a derivative filter with a size different from a size of the derivative filter.

Still a further object of the invention is to provide an image reading apparatus including an image reading unit for reading a document image and converting the document image into image data, an image processing unit for applying image processes containing edge enhancing process to the image data, and a transmission unit for transmitting the processed image data. In addition, the image processing unit includes a halftone dot detector for detecting a halftone dot region using the image data, a first edge enhancing unit for applying edge enhancement process to the detected halftone dot region using a derivative filter, and a second edge enhancing unit for applying edge enhancement process to a non-halftone dot region other than the halftone dot region using a derivative filter with a size different from a size of the derivative filter.

Still a further object of the invention is to provide an image forming apparatus including an image reading unit for reading a document image and converting the document image into image data, an image processing unit for applying image processes containing edge enhancing process to the image data, and an image forming unit for forming the processed image data on a printing medium. Furthermore, the image processing unit includes a halftone dot detector for detecting a halftone dot region using the image data, a first edge enhancing unit for applying edge enhancement process to the detected halftone dot region using a derivative filter, and a second edge enhancing unit for applying edge enhancement process to a non-halftone dot region other than the halftone dot region using a derivative filter with a size different from a size of the derivative filter.

Another object of the invention is to provide an image processing method including the steps of receiving image data, detecting a halftone dot region using the received image data, executing edge detection over the detected halftone dot region using a derivative filter, and executing edge detection over a non-halftone dot region other than the detected halftone dot region using a derivative filter with a size different from a size of the derivative filter.

A further object of the invention is to provide an image processing method including the steps of receiving image data, detecting a halftone dot region using the received image data, applying edge enhancement process to the detected halftone dot region using a derivative filter, and applying edge enhancement process to a non-halftone dot region other than the halftone dot region using a derivative filter with a size different from a size of the derivative filter.

Another object of the invention is to provide a storage medium carrying data generated by programming an image processing method including the steps of receiving image data, detecting a halftone dot region using the received image data, executing edge detection over the detected halftone dot region using a derivative filter, and executing edge detection over a non-halftone dot region other than the detected halftone dot region using a derivative filter with a size different from a size of the derivative filter.

A further object of the invention is to provide a storage medium carrying data generated by programming an image processing method including the steps of receiving image data, detecting a halftone dot region using the received image data, applying edge enhancement process to the detected halftone dot region using a derivative filter, and applying edge enhancement process to a non-halftone dot region other than the halftone dot region using a derivative filter with a size different from a size of the derivative filter.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 2 is a block diagram of an image correction unit and a feature detection unit of an image processing unit of the digital copying machine;

FIG. 7 is a block diagram of an image correction unit and a feature detection unit of an image processing unit of the digital copying machine.

DETAILED DESCRIPTION OF THE EMBODIMENTS

The embodiments of this invention will be described below with reference to the accompanying drawings.

EMBODIMENT 1

Figure 1:
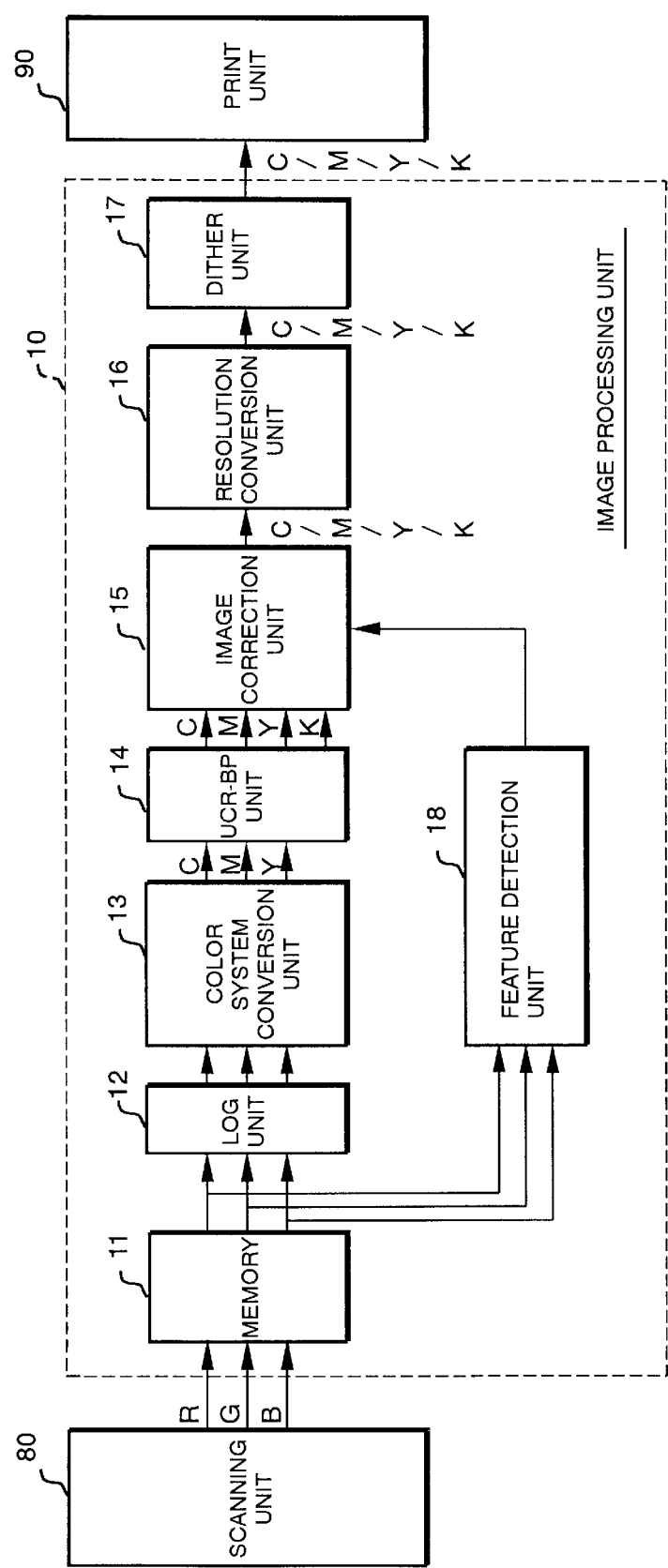
FIG. 1 is a block diagram of a digital copying machine according to embodiment 1.

The digital copying machine shown in FIG. 1 includes a scanning unit 80 for reading document images, an image processing unit 10, and a print unit 90 for printing output data on papers. The image processing unit 10 contains a memory 11, a LOG unit 12, a color system conversion unit 13, a UCR (under color removal)-BP (black paint) unit 14, an image correction unit 15, a resolution conversion unit 16, a dither unit 17, and a feature detection unit 18. Since the basic control circuit and mechanical structure are similar to those of the conventional machine, their descriptions are omitted.

General operations of the image processing unit 10 are described following the flow of the image data.

First, RGB image data of the document outputted from the scanning unit 80 is stored in the memory 11. The RGB image data is read from the memory 11 in synchronization with printing timing signal from the print unit 90, and inputted into the LOG unit 12 and the feature detection unit 18.

At the LOG unit 12 the RGB image data is logarithmically converted. The logarithmic data is inputted into the color system conversion unit 13 and converted into CMY image data. The CMY image data is inputted into the UCR-BP unit 14 and converted into CMYK image data. The CMYK image data is inputted into the image correction unit 15.

At the feature detection unit 18, the RGB image data is classified. The result of the classification is entered into the image correction unit 15.

At the image correction unit 15, the CMYK image data is treated with filtering process according to the classification result from the feature detection unit 18 in addition to conventional corrections such as the gamma correction. Next, the image data is inputted into the resolution conversion unit 16 to have its resolution converted. More specifically, the resolution of the image data is converted from 300 dpi×300 dpi, which is the reading resolution of the scanning unit 80, to 2400 dpi×600 dpi, which is the resolution of the dither process table. The image data is entered into the dither unit 17 to be compared with the dither table to be binarized. In other words, multi value image data is converted into binary image data. The binary image data is inputted into the print unit 90 via a printer video interface (not shown).

Next, the feature detection unit 18, into which the RGB image data read from the memory 11 is inputted similar to the LOG unit 12, is described in detail.

Figure 3A:
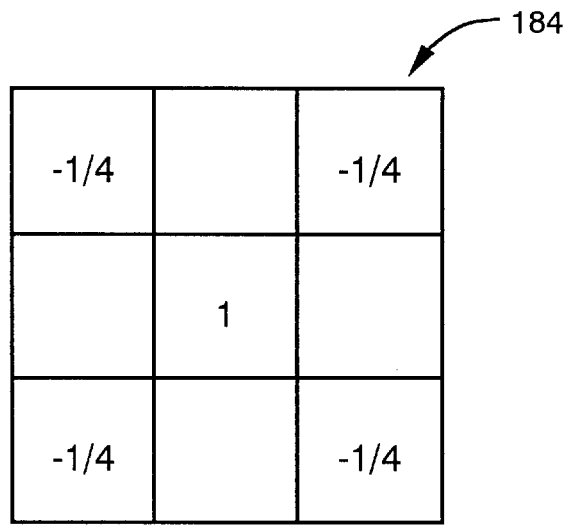
FIG. 3A and FIG. 3B are first and second filters used for edge detection in the feature detection unit.
Figure 3B:
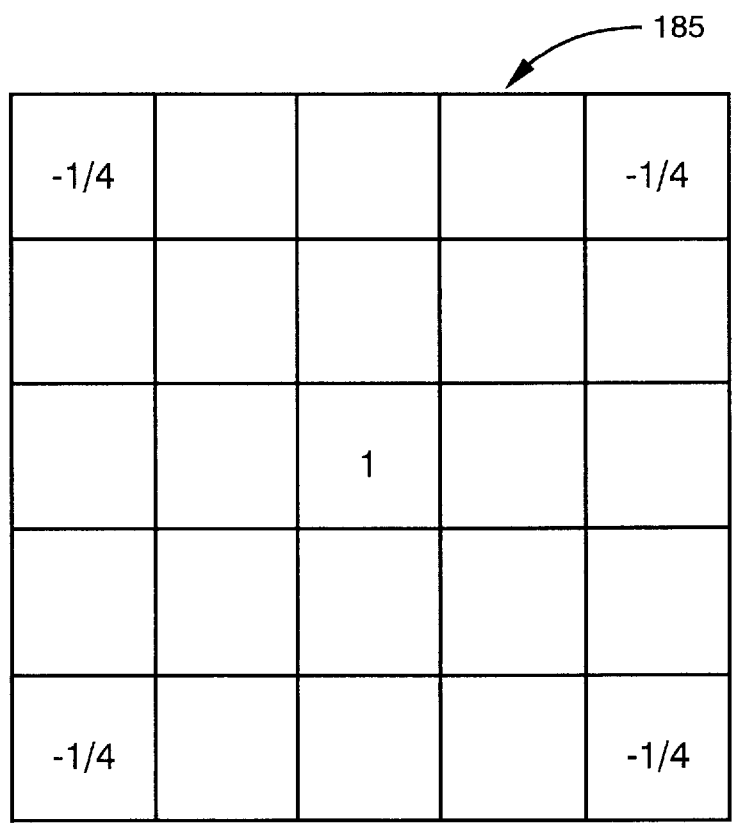

The feature detection unit 18 includes a brightness calculation unit 181, a halftone dot detector 182, an edge detector 183 and a total judgment unit 188 as shown in FIG. 2. Moreover, the edge detector 183 consists of a first filter 184, a second filter 185, a selector 186, and an edge identifying unit 187. The first and second filters 184 and 185 are ordinary second derivative filters called Laplacian filters and are used for detecting edges based on the brightness gradient. The size of the second filter 185 is greater than the first filter 184. FIG. 3A and FIG. 3B are examples of the first and second filters 184 and 185, respectively.

When the brightness calculation unit 181 receives the RGB image data, it calculates the brightness V of each pixel of the RGB image data according to the following formula, where $k_1$, $k_2$ and $k_3$ are constants:

$$V = k_1 \times R + k_2 \times G + k_3 \times B$$

Next, the brightness data is entered into the edge detector 183 as well as into the halftone dot detector 182.

At the halftone dot detector 182, it is judged whether each pixel is an isolated point based on the brightness data. If the difference between the brightness $V_i$ of each of neighboring pixels and the brightness $V_0$ of a target pixel is greater than the specified threshold value $V_T$ as shown in the formula below, the target pixel is identified as an isolated point:

$$(V_i - V_0) > V_T$$

wherein the symbol "i" is a positive integer between 1 through N that corresponds to the number of the neighboring pixels to be set.

Next, the number of pixels that are identified as isolated points existing in an area greater than an area used for the judgement of the isolated point is counted. For example, the area for counting may consist of 20 pixels×20 pixels. If the number of the isolated points is not less than a certain number, e.g., 30, the target pixel is identified as belonging to the halftone dot region and if the number of the isolated points is under the certain number, the target pixel is identified as belonging to the non-halftone dot region. In this way, every pixel is judged whether it belongs to the halftone dot region.

The judgment result is inputted into the total judgment unit 188 and the selector 186. The judgment can also be executed by means of identifying a nonwhite background or a white background in lieu of the above-described method based on isolation points.

On the other hand, at the edge detector 183, the brightness data from the brightness calculation unit 181 is entered into the filters 184, 185. The outputs from the filters 184, 185 are inputted into the selector 186.

The outputs of the filters 184 and 185, which result from operations of the brightness of pixels within a specified area the center of which the target pixel is located and the coefficients of the filters 184 and 185, represent gradients of brightness. For example, the output L of the second filter 185, which is a matrix consisting of five rows and five columns as shown in FIG. 3B, for the 5 pixels×5 pixels is obtained from the following formula:

$$L = (4 \times V_{33} - V_{11} - V_{15} - V_{51} - V_{55})/4$$

wherein the numbers 33, 11, 15, 51 and 55 represent the position of each pixel. For example, $V_{33}$ is the brightness of the target pixel, which is located in the center, or the crossing point of the third row and the third column, of the matrix. The absolute value of the output L of a pixel that belongs to an edge segment is large, and the output L of a pixel that belongs to a non-halftone dot region is zero.

The selector 186 selects either the output of the first filter 184 or the output of the second filter 185 depending on the identification result of the halftone dot detector 182. The selected output is inputted into the edge identifying unit 187. More specifically, the output of the second filter 185, which is the larger of the two, is selected if the target pixel is judged to belong to the halftone dot region, and the output of the first filter 184, which is the smaller of the two, is selected if the target pixel is judged to belong to a non-halftone dot region.

The edge identifying unit 187 judges that a pixel belongs to a large brightness gradient segment, i.e., an edge segment, if the absolute value of the selected output is not less than the threshold value and that a pixel belongs to a non-edge segment, if the absolute value of the selected output is under the threshold value. The output result is inputted into the total judgment unit 188.

The total judgment unit 188 classifies the target pixel to either the character, halftone, or flat element, depending on the detection results of the edge identifying unit 187 and the halftone dot detector 182. The character element corresponds to a case where the target pixel belongs to the edge segment. The halftone element corresponds to a case where the target pixel belongs to the halftone dot region and the non-edge segment. The flat element corresponds to all other cases. The result of the classification is inputted into the image correction unit 15.

Next, the image correction unit 15, into which the CMYK image data from the UCR-BP unit 14 and the classification results from the feature detection unit 18 are inputted, is described below in detail.

The image correction unit 15 has a smoothing filter 151, a pass-through circuit 152, an edge enhancing circuit 153 and a selector 154. The selector 154 receives the classification results of the feature detection unit 18.

The CMYK image data is inputted into the selector 154 via the smoothing filter 151, the pass-through circuit 152, and the edge enhancing circuit 153. The selector 154 selects either one of the outputs of the smoothing filter 151, the pass-through circuit 152, or the edge enhancing circuit 153 depending on the judgment result of the total judgment unit 188. More specifically, the edge enhancing process is applied to the data that belong to the character elements. Data that belong to the halftone elements are smoothed in order to prevent the Moiré effect from occurring. The filtering process is not applied to data that belong to the flat elements. The selected output is sent to the print unit 90 via the resolution conversion unit 16, the dither unit 17 and the printer video interface.

Next, the difference between the filters 184 and 185 used for edge detection is described below.

Figure 4A:
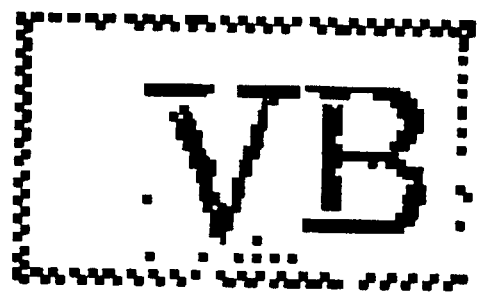
FIG. 4A and FIG. 4B show examples of edge detection applied to a halftone dot region where character elements exist and a non-halftone dot region where character elements exist using the second filter.
Figure 4B:

When the edge detection using the second filter 185, which is the larger derivative filter, is applied to the halftone dot region, the halftone elements can be scarcely detected, while character elements in the halftone dot region can be detected with a high accuracy as shown in FIG. 4A. On the other hand, if the same is applied to the non-halftone dot region where character elements exist, i.e., to a white background where characters are written, the detection accuracy of the character elements in the non-halftone dot region is not sufficient as shown in FIG. 4B.

Figure 5A:
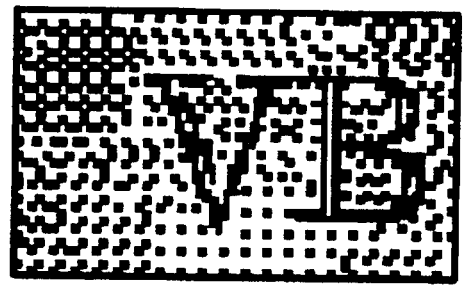
FIG. 5A and FIG. 5B show examples of edge detection applied to a halftone dot region where character elements exist and a non-halftone dot region where character elements exist using the first filter.
Figure 5B:
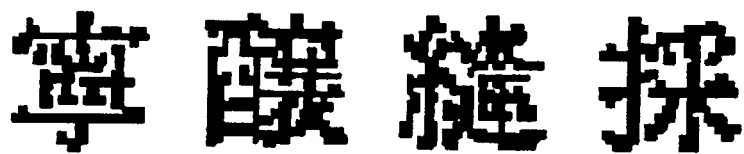

If the edge detection using the first filter, which is the smaller derivative filter, is applied to the halftone dot region, the halftone elements as well as the character elements can be detected at a high accuracy as shown in FIG. 5A. On the other hand, if the same is applied to the non-halftone dot region, the character elements in the non-halftone dot region can be detected at a high accuracy as shown in FIG. 5B.

There is a difference in the threshold value, which is used for the edge detection by the edge identifying unit 187, between the first and second filters 184, 185. Specifically, the first filter 184 is smaller than the second filter 185 and the Laplacian value of the former is also smaller than that of the latter, so that the threshold value of the former is also set lower than that of the latter.

In embodiment 1, image data is classified based on the edge detection result of the image data by means of the first and second filters, as well as the judgment whether the image data belongs to the halftone dot region. The filtering process will be applied to the image data that suits the classification. Specifically, the edge enhancing process will be applied to character elements of the non-halftone dot region and character elements of the halftone dot region, to reproduce details sharply. On the other hand, the smoothing process is applied to the halftone dot region excluding the character elements, i.e., the halftone elements, to prevent the Moiré effect from occurring.

EMBODIMENT 2

Figure 6:
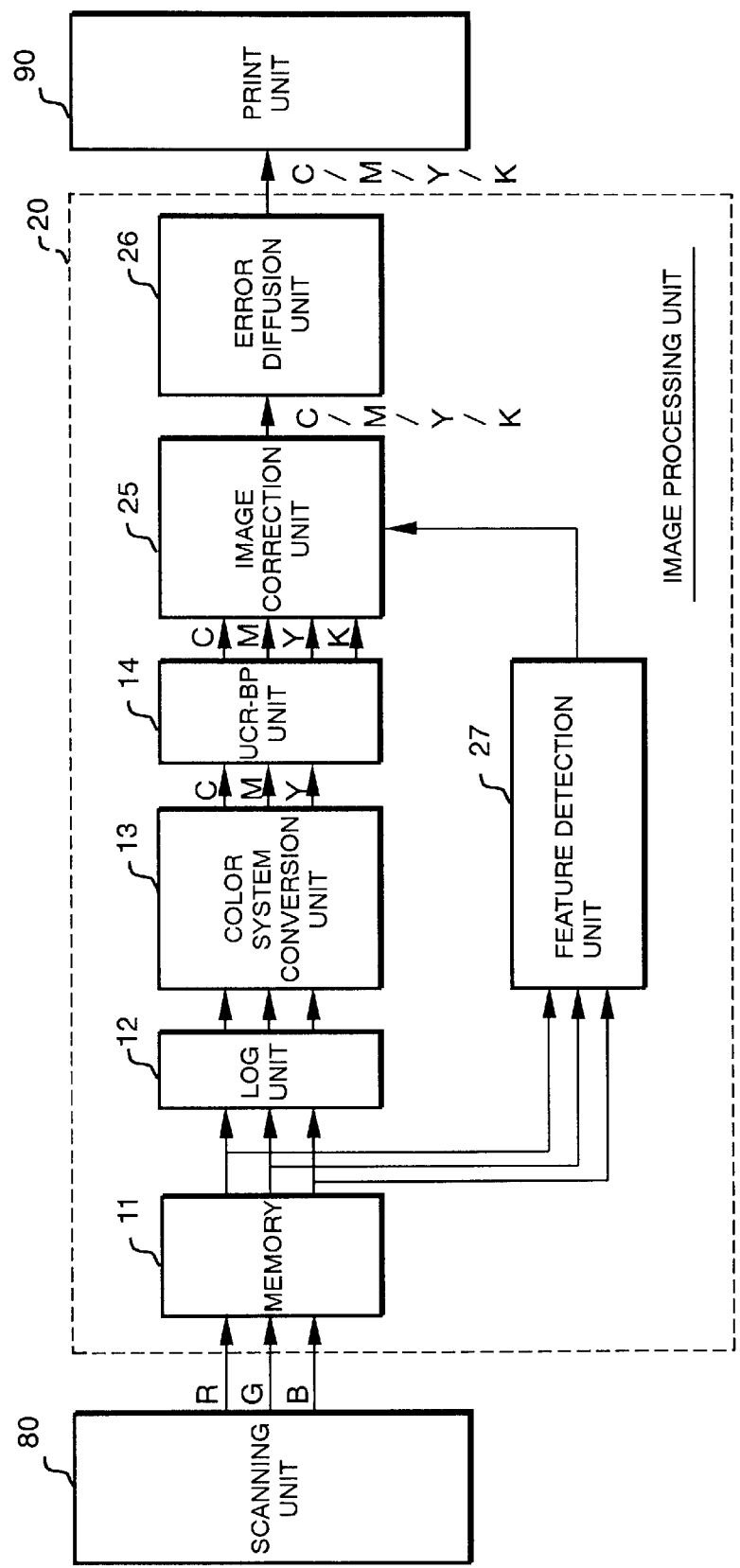
FIG. 6 is a block diagram of a digital copying machine according to embodiment 2.

The digital copying machine shown in FIG. 6 includes an image correction unit 25, an error diffusion unit 26 and a feature detection unit 27 in the image processing unit 20. Embodiment 2 differs from embodiment 1 in that respect. As some parts of this machine that perform functions similar to those of corresponding parts of embodiment 1 are identified with the same symbols respectively, descriptions of those parts are partially omitted here.

The outline of the image processing unit 20 is described following the flow of the image data.

First, RGB image data of the document outputted from the scanning unit 80 is stored in the memory 11. The RGB image data is read from the memory 11 in synchronization with printing timing signal from the print unit 90, and inputted into the LOG unit 12 and the feature detection unit 27.

At the LOG unit 12 the RGB image data is logarithmically converted. The logarithmic data is inputted into the color system conversion unit 13 and converted into CMY image data. The CMY image data is inputted into the UCR-BP unit 14 and converted into CMYK image data. The CMYK image data is inputted into the image correction unit 25.

At the feature detection unit 27 the RGB image data is classified. The result of the classification is entered into the image correction unit 25.

At the image correction unit 25, the CMYK image data is treated with filtering process according to the classification result from the feature detection unit 27 in addition to conventional corrections such as the gamma correction. Next, the image data is inputted into the error diffusion unit 26. The multi-value image data is converted into a binary image data by means of the error diffusion process. The binary image data is inputted into the print unit 90 via a printer video interface (not shown).

The feature detection unit 27 and the image correction unit 25 are described in detail referring to FIG. 7 in the following.

The feature detection unit 27 has the brightness calculation unit 181 and the halftone dot detector 182. The brightness calculation unit 181 calculates the brightness of the pixels of the RGB image data read from the memory 11 in synchronization with the print timing signal from the print unit 90 as in embodiment 1. Next, the brightness data is inputted into the halftone dot detector 182. At the halftone dot detector 182, the target pixel is judged whether it belongs to the halftone dot region based on the isolated point method. The result of the detection is inputted into the image correction unit 25.

The image correction unit 25 has a selector 253, a first filter 251, and a second filter 252. The detection result of the feature detection unit 27 is inputted into the selector 253.

Figure 8A:
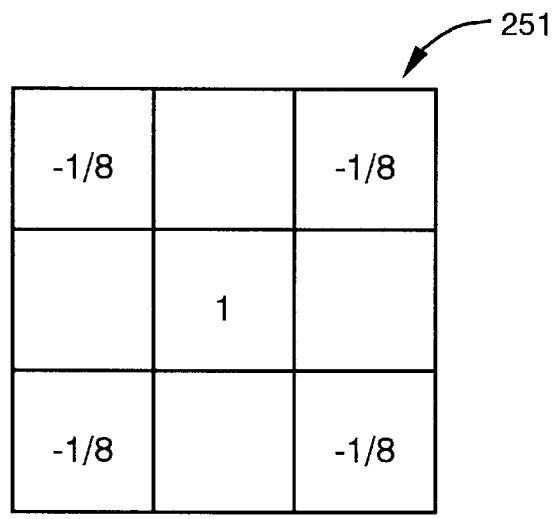
FIG. 8A and FIG. 8B are first and second filters used for edge detection in the feature detection unit.
Figure 8B:
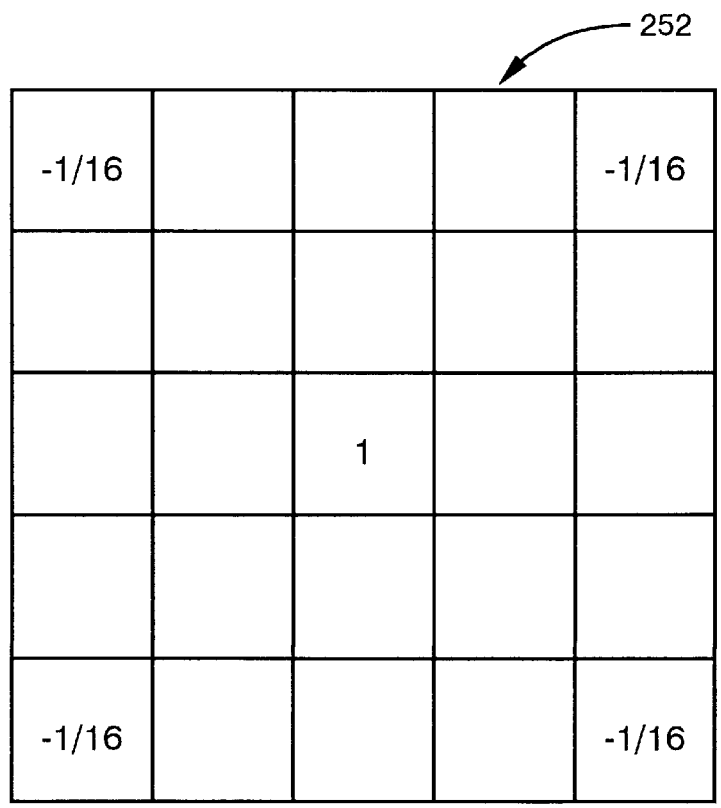

The first and second filters 251, 252 into which the image data from The UCR-BP unit 14 is inputted consist of the first derivative filer or the second derivative filter that are normally used for the edge enhancing process. The size of the second filter 252 is greater than the size of the first filter 251. FIG. 8A and FIG. 8B show examples of the first and second filters 251, 252. The first and second filters 251, 252 are different from the first and second filters 184, 185 of embodiment 1 in terms of the coefficients.

When the first filter 251, which is the smaller derivative filter in size, is applied to an image data that belongs to the non-halftone dot region, fine points and lines will be enhanced. Therefore, character elements in the non-halftone dot region, for example, letters written on a white background, will be reproduced sharply. On the other hand, when the second filter 252, which is the larger derivative filter in size, is applied to an image data that belongs to the halftone dot region, halftone elements will be scarcely enhanced. In addition, character elements in the halftone dot region will be reproduced sharply.

After the edge enhancing process by the first and second filters 251 and 252, both results are inputted into the selector 253.

The selector 253 selects either one of the outputs of the first or second filters 251 or 252 based on the detection result of the feature detection unit 27 and transmits it to the error diffusion unit 26. More specifically, it selects the output of the first filter 251, which is the smaller of the two, if the image data belongs to the non-halftone dot region. In addition, it selects the output of the second filter 252, which is the larger of the two, when the image data belongs to the halftone dot region.

According to embodiment 2, either one of the first and second filters is selected depending on the detection result whether the image data belongs to the halftone dot region. Consequently, while character elements of the halftone dot region are enhanced similar to character elements of the non-halftone dot region, enhancement of the halftone dot region can be suppressed. In other words, while details of character elements are reproduced sharply, the Moiré effect due to the relation between the space frequency of halftone dots and the scanning cycle is suppressed.

It is obvious that this invention is not limited to the particular embodiments shown and described above but may be variously changed and modified without departing from the technical concept of this invention.

In both embodiments 1 and 2, one of the outputs of the filters is selected by the selector located on the downstream side of the filters. However, it is possible to input the image data into one of the filters selected by a selector placed on the upstream side of the filters.

The size of the filter does not necessarily have to be a fixed type, but rather can be set up as a variable type. Moreover, the number of filters does not have to be limited to two, but rather various sizes of filters can be used as well.

Moreover, although embodiments 1 and 2 are described concerning digital copying machines as an application example, the invention can be also applied to image reading apparatuses for reading document images such as scanners, or computers such as personal computers. Specifically, the image reading apparatuses can be integrated with similar units as the image processing units of embodiments 1 and 2. In case of computers, a storage medium that carrying data generated by programming the operating procedure of the image processing unit can be provided.

What is claimed is:

1. An image processing apparatus comprising:
   a receiving unit for receiving image data;
   a halftone dot detector for detecting a halftone dot region using the received image data;
   a first edge detector for executing edge detection over the detected halftone dot region using a first derivative filter; and
   a second edge detector for executing edge detection over a non-halftone dot region other than the detected halftone dot region using a second derivative filter with a size different from a size of said first derivative filter.

2. An apparatus according to claim 1, in which the size of said first derivative filter for the halftone dot region is greater than the size of said second derivative filter for the non-halftone dot region.

3. An apparatus according to claim 1, further comprising an image correction unit for applying edge enhancement process to the image data.

4. An apparatus according to claim 1, further comprising an image correction unit for applying smoothing process to the image data.

5. An image reading apparatus comprising:

an image reading unit for reading a document image and converting the document image into image data;

an image processing unit for applying image processes including edge enhancing process and smoothing process to the image data, comprising a halftone dot detector for detecting a halftone dot region using the image data, a first edge detector for executing edge detection over the detected halftone dot region using a first derivative filter, and a second edge detector for executing edge detection over a non-halftone dot region other than the detected halftone dot region using a second derivative filter with a size different from a size of said first derivative filter; and a transmission unit for transmitting the processed image data.

6. An image forming apparatus comprising:

an image reading unit for reading a document image and converting the document image into image data;

an image processing unit for applying image processes including edge enhancing process and smoothing process to the image data, comprising a halftone dot detector for detecting a halftone dot region using the image data, a first edge detector for executing edge detection over the detected halftone dot region using a first derivative filter, and a second edge detector for executing edge detection over a non-halftone dot region other than the detected halftone dot region using a second derivative filter with a size different from a size of said first derivative filter; and an image forming unit for forming the processed image data on a printing medium.

7. An image processing apparatus comprising:

a receiving unit for receiving image data;

a halftone dot detector for detecting a halftone dot region using the received image data;

a first edge enhancing unit for applying edge enhancement process to the detected halftone dot region using a first derivative filter; and a second edge enhancing unit for applying edge enhancement process to a non-halftone dot region other than the halftone dot region using a second derivative filter with a size different from a size of said first derivative filter.

8. An apparatus according to claim 7, in which the size of said first derivative filter for the halftone dot region is greater than the size of said second derivative filter for the non-halftone dot region.

9. An image reading apparatus comprising:

an image reading unit for reading a document image and converting the document image into image data;

an image processing unit for applying image processes including edge enhancing process to the image data, comprising a halftone dot detector for detecting a halftone dot region using the image data, a first edge enhancing unit for applying edge enhancement process to the detected halftone dot region using a first derivative filter, and a second edge enhancing unit for applying edge enhancement process to a non-halftone dot region other than the halftone dot region using a second derivative filter with a size different from a size of said first derivative filter; and a transmission unit for transmitting the processed image data.

10. An image forming apparatus comprising:

an image reading unit for reading a document image and converting the document image into image data;

an image processing unit for applying image processes including edge enhancing process to the image data, comprising a halftone dot detector for detecting a halftone dot region using the image data, a first edge enhancing unit for applying edge enhancement process to the detected halftone dot region using a first derivative filter, and a second edge enhancing unit for applying edge enhancement process to a non-halftone dot region other than the halftone dot region using a second derivative filter with a size different from a size of said first derivative filter; and an image forming unit for forming the processed image data on a printing medium.

11. An image processing method comprising the steps of:

receiving image data;

detecting a halftone dot region using the received image data;

executing edge detection over the detected halftone dot region using a first derivative filter; and executing edge detection over a non-halftone dot region other than the detected halftone dot region using a second derivative filter with a size different from a size of said first derivative filter.

12. A method according to claim 11, further comprising a step of applying edge enhancement process to the image data.

13. A method according to claim 12, further comprising a step of applying smoothing process to the image data.

14. An image processing method comprising the steps of:

receiving image data;

detecting a halftone dot region using the received image data;

applying edge enhancement process to the detected halftone dot region using a first derivative filter; and applying edge enhancement process to a non-halftone dot region other than the halftone dot region using a second derivative filter with a size different from a size of said first derivative filter.

15. A storage medium carrying data generated by programming an image processing method comprising the steps of:

receiving image data;

detecting a halftone dot region using the received image data;

executing edge detection over the detected halftone dot region using a first derivative filter; and executing edge detection over a non-halftone dot region other than the detected halftone dot region using a second derivative filter with a size different from a size of said first derivative filter.

16. A storage medium according to claim 15, in which said method further comprising a step of applying edge enhancement process to the image data.

17. A storage medium according to claim 15, in which said method further comprising a step of applying smoothing process to the image data.

18. A storage medium carrying data generated by programming an image processing method comprising the steps of:

receiving image data;

detecting a halftone dot region using the received image data;

applying edge enhancement process to the detected halftone dot region using a first derivative filter; and applying edge enhancement process to a non-halftone dot region other than the halftone dot region using a second derivative filter with a size different from a size of said first derivative filter.

* * * * *